(12) United States Patent
Kaplan

(10) Patent No.: US 8,078,143 B2
(45) Date of Patent: Dec. 13, 2011

(54) REMOTELY CONTROLLING ACCESS TO A WIRELESS HANDSET

(75) Inventor: Diego Kaplan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 845 days.

(21) Appl. No.: 11/609,658

(22) Filed: Dec. 12, 2006

(65) Prior Publication Data

US 2010/0273449 A1    Oct. 28, 2010

(51) Int. Cl.
| H04M 1/66 | (2006.01) |
| H04M 1/68 | (2006.01) |
| H04M 3/16 | (2006.01) |
| H04B 1/06 | (2006.01) |
| H04B 1/38 | (2006.01) |
| H04M 3/00 | (2006.01) |
| H04M 1/00 | (2006.01) |
| H04M 15/00 | (2006.01) |
| H04W 24/00 | (2009.01) |
| G06F 1/26 | (2006.01) |
| G06F 11/00 | (2006.01) |
| G08B 13/00 | (2006.01) |
| G08B 21/00 | (2006.01) |
| G08B 29/00 | (2006.01) |

(52) U.S. Cl. ....... 455/410; 455/411; 455/26.1; 455/419; 455/420; 455/456.1; 455/456.2; 455/457; 455/558; 455/564; 455/565; 379/114.14; 726/34; 726/35

(58) Field of Classification Search ................ 455/26.1, 455/564–565, 410–411, 456.1–456.2, 457, 455/419–420, 558; 379/114.14; 726/34–35
See application file for complete search history.

(56) References Cited

U.S. PATENT DOCUMENTS

| 6,662,023 | B1 * | 12/2003 | Helle ............................ 455/558 |
| 2004/0203601 | A1 * | 10/2004 | Morriss et al. ................ 455/411 |
| 2007/0274484 | A1 * | 11/2007 | Frank et al. .............. 379/114.13 |

* cited by examiner

Primary Examiner — Nick Corsaro
Assistant Examiner — Munsoon Choo

(57) ABSTRACT

A wireless handset configured to be remotely accessed is described. The wireless handset comprises a user interface, a handset memory, a processor, and a software module. The user interface resident on the wireless handset is configured to enable the wireless handset to be remotely controlled with a remote lock password. The handset memory stores the remote lock password. The processor is adapted to receive a remote lock message from another electronic device. The remote lock message comprises a received password and a target phone number. The software module matches the received password with the remote lock password and then proceeds to send at least one call to the target phone number. Additionally, a method for controlling usage of the wireless handset is also described.

12 Claims, 6 Drawing Sheets

REMOTELY CONTROLLING ACCESS TO A WIRELESS HANDSET

FIELD OF THE INVENTION

This invention relates to the recovery of a lost, misplaced or stolen wireless handset. More particularly, the invention relates to remotely controlling access to the wireless handset to aid in the recovery of the wireless handset.

BACKGROUND

Wireless handsets are commonly misplaced, lost or stolen. For example, a misplaced mobile phone may be left in a variety of different places such as a car, a household couch, a desk drawer at home, a desk drawer in the office, or a briefcase. The mobile handset may also be stolen, and it is difficult to distinguish between a misplaced phone and a stolen phone. Thus, if the wireless handset is misplaced, the user has to make a difficult decision between waiting to find the phone or contacting the service provider and cancelling services associated with the wireless handset.

When an owner's handset is lost, the owner assumes the worst and fears that costly calls are being made on the wireless handset. Generally, the owner proceeds to quickly cancel the service, which makes the recovery of the headset significantly more challenging or impossible.

To avoid replacement costs it would be desirable for the handset's owner to be able to communicate with the person that recovered the phone. The phone's owner wants to find the handset to avoid replacement costs and because the handset holds contact information, photographs, music, and other personal information. If the phone is insured, the carrier also has an interest in recovering the handset to minimize replacement costs.

If a handset is inadvertently left in a taxi cab, a hotel room, or an airplane, the individual that that finds the handset may be unable to locate the owner of the phone. If the individual is a Good Samaritan, the individual may check the contacts list or the dialed and received calls list, and inform someone on the handset call history that the phone has been located.

However, if the phone is locked, or the person that locates the handset has more dishonest intentions, then the phone's owner or the carrier would like to communicate directly with the individual that located the wireless handset.

Accordingly there remains a strong need in the art to control any charges that are made with the misplaced, lost or stolen handset, and further to simplify the process of locating the handset.

SUMMARY

A wireless handset configured to be remotely accessed is described. The wireless handset comprises a user interface, a handset memory, a processor, and a software module. The user interface resident on the wireless handset is configured to enable the wireless handset to be remotely controlled with a remote lock password. The handset memory stores the remote lock password. The processor is adapted to receive a remote lock message from another electronic device. The remote lock message comprises a received password and a target phone number. The software module first matches the received password with the remote lock password and then proceeds to send at least one call to the target phone number.

A wireless handset operatively coupled to a network system and configured to be remotely accessed is also described. The handset and network system comprise a handset user interface resident on the wireless handset that is configured to enable the wireless handset to be remotely accessed with the remote password. The handset and network system also comprise a means for storing the remote lock password, and a means for receiving a remote lock message from another electronic device wherein the remote lock message comprises a received password and a target phone number. Additionally, the handset and network system also comprise a means for matching the received password with the remote lock password, and a means for sending at least one call to the target phone number.

A method for controlling usage of a wireless handset is also described. The method comprises accessing the wireless handset to configure the wireless handset to be remotely accessed with the remote lock password. The method then proceeds to store the remote lock password. A remote lock message that originates from another electronic device is then received. The remote lock message comprises a received password and a target phone number. After matching the received password with the remote password, the method proceeds to send at least one call to the target phone number.

BRIEF DESCRIPTION OF THE DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the method may vary as to details, order of the actions, or other variations without departing from the illustrative method disclosed herein.

Figure 1:
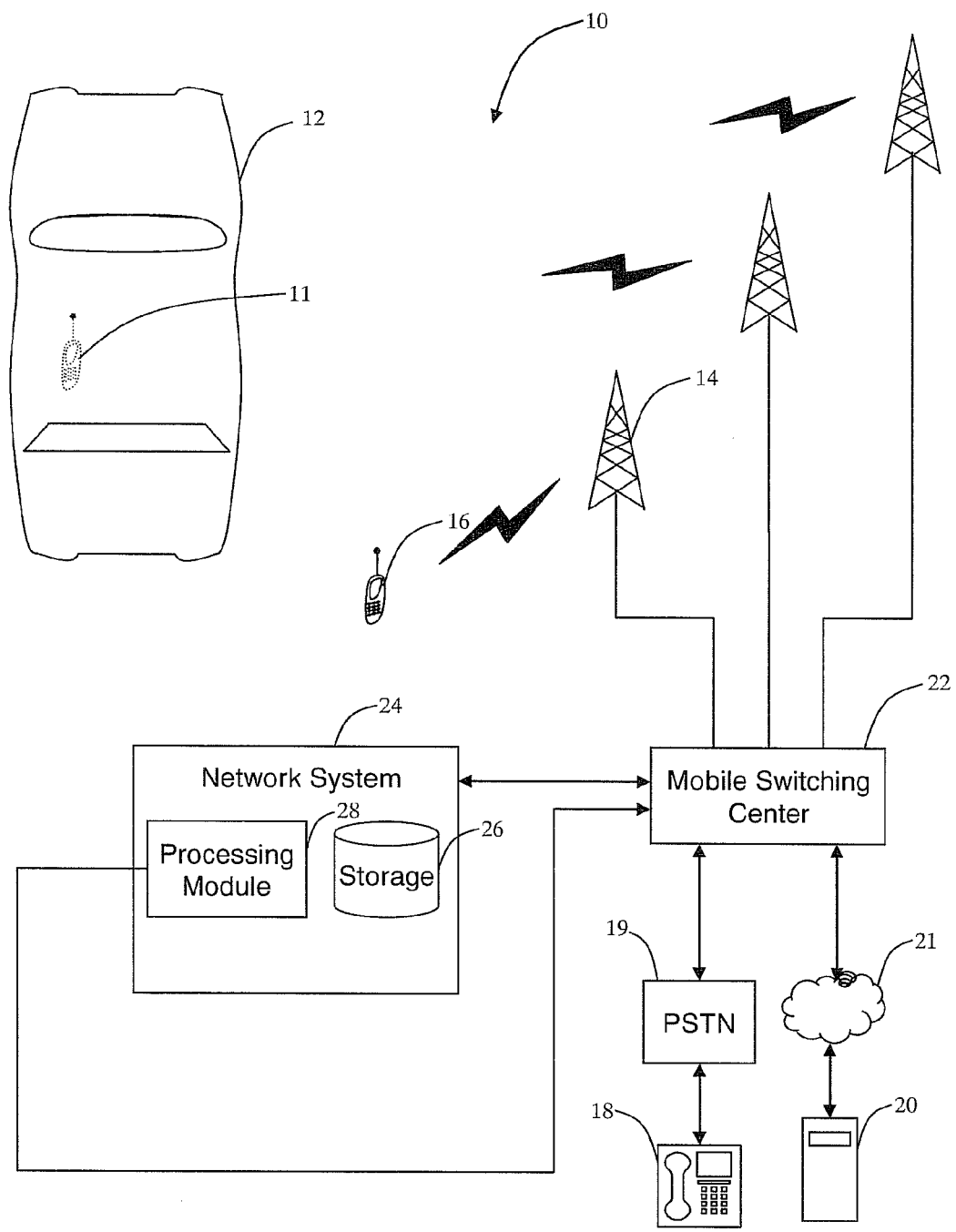
FIG. 1 shows an illustrative communication system that permits aiding in the recovery of a lost, misplaced, or stolen handset.

Referring to FIG. 1, there is shown an illustrative communication system 10 that permits aiding in the recovery of a lost, misplaced, or stolen handset. The apparatus, systems and methods describe remotely controlling access to a wireless handset to aid in the recovery of the missing wireless handset. The missing wireless handset may be lost, misplaced or stolen.

In FIG. 1, a wireless handset 11 is inadvertently left in an automobile 12. The illustrative automobile 12 may be a taxi cab, a rented car, or any other such vehicle. The wireless handset 11 may be a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network (WLAN) or WiMAX. It shall be appreciated by those of ordinary skill in the art that the term wireless handset, mobile handset, wireless phone, and mobile phone are interchangeable.

Although, the wireless handset 11 is in communication with an antenna 14, the wireless handset 11 can not be found by the user or owner of the wireless handset 11. The antenna 14 may be one of a plurality of base station antennas associated with a cellular phone network, or an antenna associated with WLAN access point, or any other such antenna that is used to communicate with the wireless handset 11.

The communication system 10 is a wireless communication system that is configured to permit a user to remotely modify the wireless handset 11 so that the handset's owner can locate the misplaced handset 11. The illustrative wireless communication system 10 comprises a mobile switching center 22, and a network system 24. The mobile switching center 22 is operatively coupled to a plurality of base station antennas 14 and is configured to communicate with the wireless handset 11.

The communication system 10 described herein enables the wireless handset 11 to be remotely accessed. In the illustrative communication system 10, the wireless handset 11 is in operative communication with the network system 24. The wireless handset 11 comprises a handset user interface that configures the wireless handset 11 to be remotely accessed using a remote lock password. The remote lock password is a password that is typically provided by the phone's owner.

When a message is sent to the wireless handset having the remote lock password, the phone can be reprogrammed so that one or more calls are sent to another phone number, which is referred to as a "target phone number." In the illustrative embodiment, the message is a Short Message Service (SMS) message. Alternatively, the message may be a Enhanced Messaging Service (EMS), Multimedia Message Service (MMS), Short Message Peer-to-Peer, or other such messaging services. Additionally, the message may be sent by electronic mail, or similar electronic means for communicating a message.

The network system 24 or wireless handset 11 provides a means for storing the remote lock password so that a match can be made after the phone has been lost or misplaced. The means for storing the remote lock password may be on the storage component 26 of the network system, or the local memory associated with the wireless handset 11 as described below.

Additionally, the network system 24 or wireless handset 11 provides a means for receiving a remote lock message from another electronic device. The remote lock message comprises a received password and a target phone number. A received password is a password that is generated by the remote electronic device and is received by the misplaced handset 11. The remote electronic device may be a separate wireless handset 16, a telephony device 18 that communicates with a public switched telephony network (PSTN) 19, a networked computer 20 that is communicatively coupled to a network cloud 21, and any other such electronic device that is enabled to communicate with the wireless handset 10. The mobile switching center 22 is configured to communicate with the remote electronic device.

The network system 24 or wireless handset 11 provides a means for matching the received password with the remote lock password. Thus, the matching of the received password (generated by the remote electronic device) with the remote lock password that is associated with the lost wireless handset 11 can be performed by either the network system 24 or the wireless handset 11.

If there is a match between the received password and the stored remote lock password, the network system 24 or wireless handset 11 provides a means for sending at least one call to the target phone number. The sending of call may depend on the limitations of the carrier's network. For example, dialed calls from the misplaced handset 11 are transferred or routed to the target phone number. Thus, when the individual that located the wireless handset 11 attempts to dial a number, and pushes the send button on the handset, the target phone number is dialed. The user interface on the wireless handset may indicate to the unauthorized user that the calls are being transferred to the target phone number. Additionally, the user interface may indicate that the phone's status as being lost, misplaced, or stolen.

Calls that are received by the misplaced handset 11 may also be forwarded to the target phone number. However, there may be limits to whether received calls can be forwarded to the target phone number. For example, forwarding received calls may require an illustrative GSM network. Alternatively, an illustrative CDMA network may also be modified to support forwarding received calls to the target phone number.

Those skilled in the art shall appreciate that calls originating from target phone number can not be forwarded to the target number because this would create an infinite loop. Therefore, the wireless handset 11, the network system 24, or a combination thereof is configured to allow receiving incoming calls from the target number at the wireless handset. Additionally, calls that originate from a phone number in the owner's address book may be received by the misplaced handset 11, even if the handset 11 is in Remote Lock mode. Furthermore, emergency 911 calls are exempt from being sent to the target number.

The network system 24 comprises a storage component 26 and a processing module 26. The storage component 26 is configured to store the remote lock password. The processing module 26 is configured to perform operations that include, but are not limited to, receiving an instruction to store the remote lock password in the storage component 26, receiving the remote lock message comprising the received password and the target phone number, matching the received password with the remote lock password, sending at least one call to the target phone number, providing a message that the handset is missing, and any combination thereof.

The illustrative network system 24 may be configured to process a request to send at least one call to the target number after the misplaced handset 11 is placed in a remote lock mode. Generally, the request comes from a validated user such as the owner of the misplaced wireless handset 11, or the service provider that manages the network, or any such entity or person that is authorized to remotely control the lost or stolen wireless handset 11.

The request to change the calls are dialed or received by the wireless handset 11 is going to be initiated from the remote electronic device such as the wireless handset 16, the telephone 18, the networked computer 20, or any other such device that is capable of communicating with the wireless handset 11. In one embodiment, the request may be communicated by permitting a user, e.g. a validated user, to access a menu on the network system 24 having user selectable options that allows remotely changing the target number for dialed calls and received calls.

In the illustrative embodiment, the network system 24 is configured to prompt the user communicating via handset 16, telephone 18, or networked computer 20 to provide a password to access the network, and which permits the validated user to change ring tones on handset 11. The password is authenticated by a password authentication module associated with processing module 28. The password authentication module may support a plurality of passwords. For example, a first password may be used to access voice mail storage 26, and a second password may be required to perform the remote lock operations.

The processing module 28 then communicates a set of programming instructions that may be downloaded to the mobile handset 11, and the downloaded programming instructions may then be executed and stored on the mobile handset 11. The downloaded programming instructions comprise the target phone number and operations associated with dialed calls and received calls. After the set of programming instructions are communicated to the misplaced wireless handset 11, the wireless handset 11 proceeds to re-program itself by executing the programming instructions.

Figure 2:
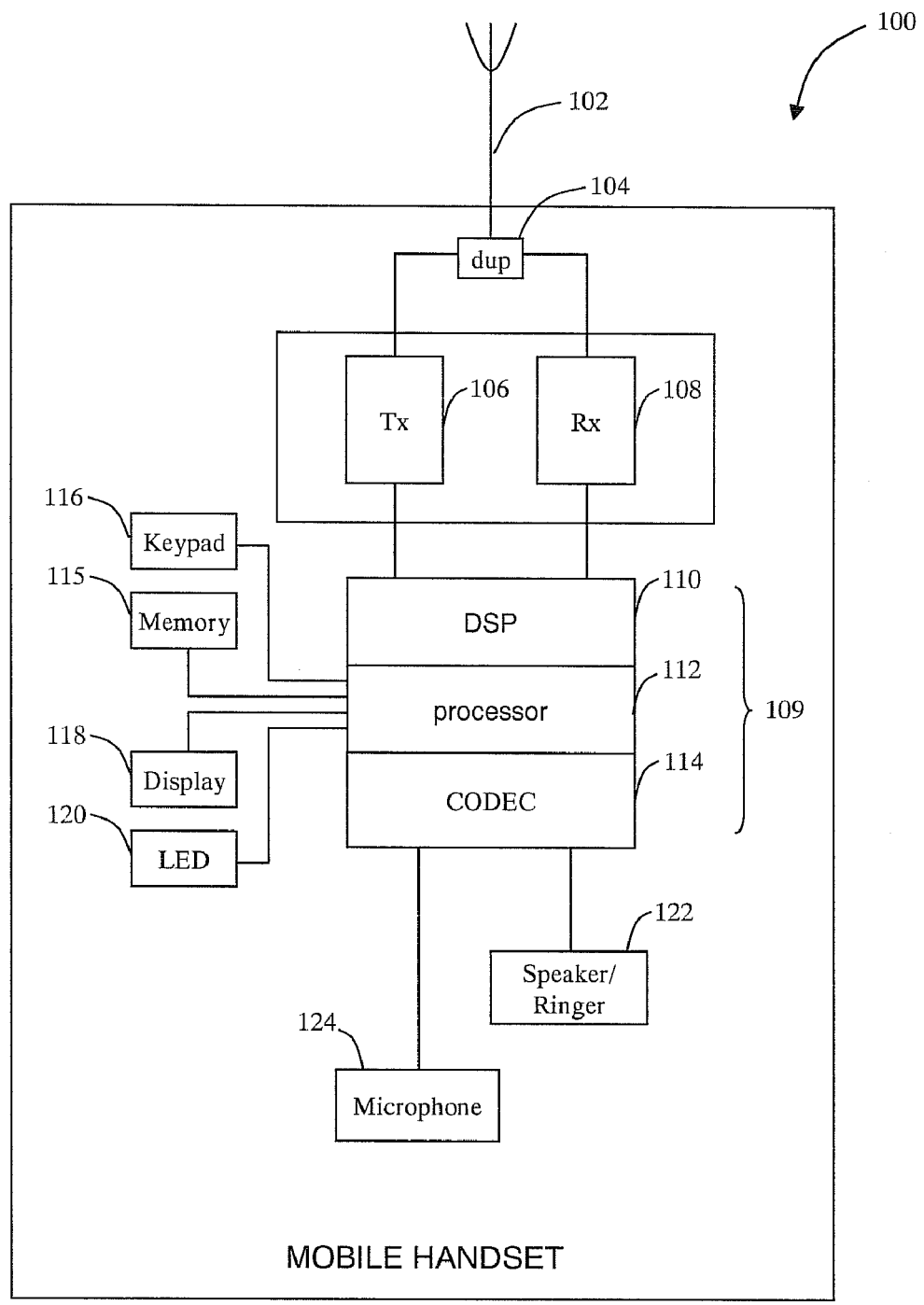
FIG. 2 shows an illustrative diagram of a mobile handset configured to operate in the illustrative communication system.

Referring to FIG. 2, there is shown an illustrative wireless handset 100 configured to operate within the illustrative communication system 10 and perform the operations associated with the misplaced wireless handset 11. In this second embodiment, the wireless handset 100 is remotely accessed, however, the operations performed by the wireless handset are more localized to the handset and do not rely on the network system 24 described above. Thus, the operations described above for remote access are performed locally on the wireless handset 100.

The illustrative wireless handset 100 comprises a first antenna element 102 that is operatively coupled to a duplexer 104, which is operatively coupled to transmitter 106 and receiver 108. An illustrative control module 109 comprises a digital signal processor (DSP) 110, a processor 112, and a codec 114 that are communicatively coupled to the transmitter 104 and receiver 108. The DSP 110 may be configured to perform a variety of operations such as controlling the antenna 102, transmitter 106, and receiver 108 operations. The processor 112 is operatively coupled to a memory 115, a keypad 116, a display 118, and at least one set of LED lights 120. A user interface (UI) is provided by the keypad 116, the display 118, the LED lights 120, or any combination thereof. The processor 112 is also operatively coupled to a codec module 114 that performs the encoding and decoding operations and is communicatively coupled to a speaker or ringer 122, and a microphone 124. The processor 112 performs a plurality of different operations that are associated with software modules that run on the processor 112 and use the memory 115. The software modules include a Remote Lock software module that uses processor 112 resources and memory 115 resources.

The illustrative wireless handset 100 may be built as a light weight and small device adapted to be portable and may be conveniently carried around by a user on a regular basis. The wireless handset 100 is further adapted for caller operation and is enabled to permit a user to manually input data with the keypad 116 that may be a normal key pad, such as key pad for a cell phone or a PDA, and may additionally include specific input keys, such as a scrolling means or the like, to input particular instructions or to perform particular selection functions. Additionally, the input data or request may be taken from voice instructions that are received from microphone 124 or a combination of voice instructions and DTMF signals. The memory module 115 may be for storing input data or storing programming instructions that have been downloaded to the mobile handset 100 or previously programming in the wireless handset 100.

For the wireless handset 100 to be remotely accessed, the following components are made use of: the user interface (UI), the handset memory 115, the processor 112, and a software module. The UI operations may be performed by the keypad 116, the display 118, the LED lights 120, or any combination thereof. The UI is configured to enable the wireless handset to be remotely controlled with a remote lock password. The UI may include displaying a "Remote Lock" text command or symbol on the display 118. The authorized user of the wireless handset 100 enables the Remote Lock feature by using the keypad 116 and selecting the Remote Lock feature from one of a series of menus displayed on the wireless handset 100.

Once the Remote Lock feature is enabled, the user is prompted for a Remote Lock password that is stored in the handset memory 115. Although the Remote Lock feature has been enabled, actual control of the handset remains with the wireless handset 100. After the Remote Lock feature is enabled, the wireless handset 100 then enters a quiet mode that simply listens for the Remote Lock password. Thus, even though the Remote Lock feature has been activated and the remote lock password has been stored locally, the person having access to wireless handset 100 maintains control of the wireless handset 100.

Control of the wireless handset 100 changes when a valid remote lock message is received by the wireless handset 100. The remote lock message comprises a received password and a target phone number, and the processor 112 processes the remote lock message. The remote lock message is generated by a remote electronic device that can communicate with the wireless handset 100. The remote electronic device may be a telephony device such as the wireless handset 16, the telephony device 18, or a networked computer 20. The remote lock message may be communicated using an SMS message, an e-mail, or any other means for communicating a message to a wireless handset.

If a valid remote lock message is received, then the phone is programmed so that any user accessing the wireless handset 100 will have calls sent to a target phone number. The switching of control from the user accessing the handset 100 to a remote authorized individual is performed by the Remote Lock software module. The Remote Lock software module first matches the received password with the remote lock password, and then sends one or more calls to the target phone number. The Remote Lock software module may be configured to transfer dialed calls to the target number. Additionally, the Remote Lock software module may be configured to forward at least one received call to the target phone number. Furthermore, the software module may control the calls that are received by the wireless handset 100.

The Remote Lock software module modifies the user interface to indicate that calls are sent to the target phone number. The display 118 may instruct the user that the phone has been remotely locked with text that states: "PHONE HAS BEEN REMOTELY LOCKED." If the unauthorized user attempts to dial a number, additional information may also be provided such as: "ALL DIALED CALLS ARE SENT TO (949) 555-1212." If the unauthorized user attempts to use the handset 100 to receive calls, the display 116 may state: "ALL RECEIVED CALLS ARE SENT TO (949) 555-1212."

Figure 3:
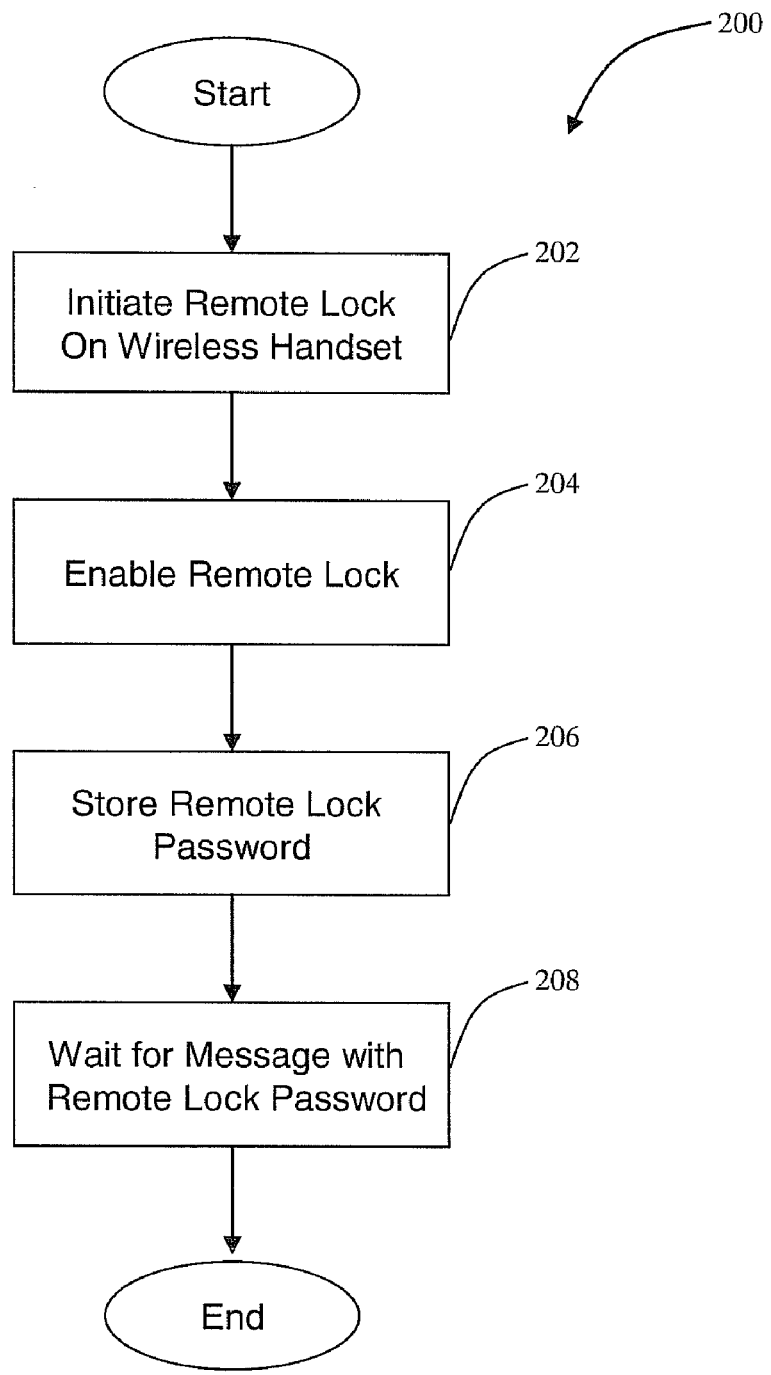
FIG. 3 shows an illustrative flowchart for enabling the Remote Lock feature on the handset.

Referring to FIG. 3, there is shown an illustrative flowchart for enabling the Remote Lock feature on the handset. The method for enabling the Remote Lock feature is initiated at block 202 where the user finds the Remote Lock feature on one of the menus on the wireless handset 10. The authorized user then proceeds to enable Remote Lock by activating or requesting the Remote Lock feature at block 204.

The authorized user is then prompted for a remote lock password, and the method proceeds to store the remote lock password as described in block 206. As described above, the remote lock password may be stored in the memory 115 of the wireless handset 100, or on the storage component of the network system 24. At block 208, the wireless handset 10 proceeds to wait for the remote lock message having the remote lock password, which permits an authorized user to remotely control the operations on the misplaced handset 10.

Figure 4A:
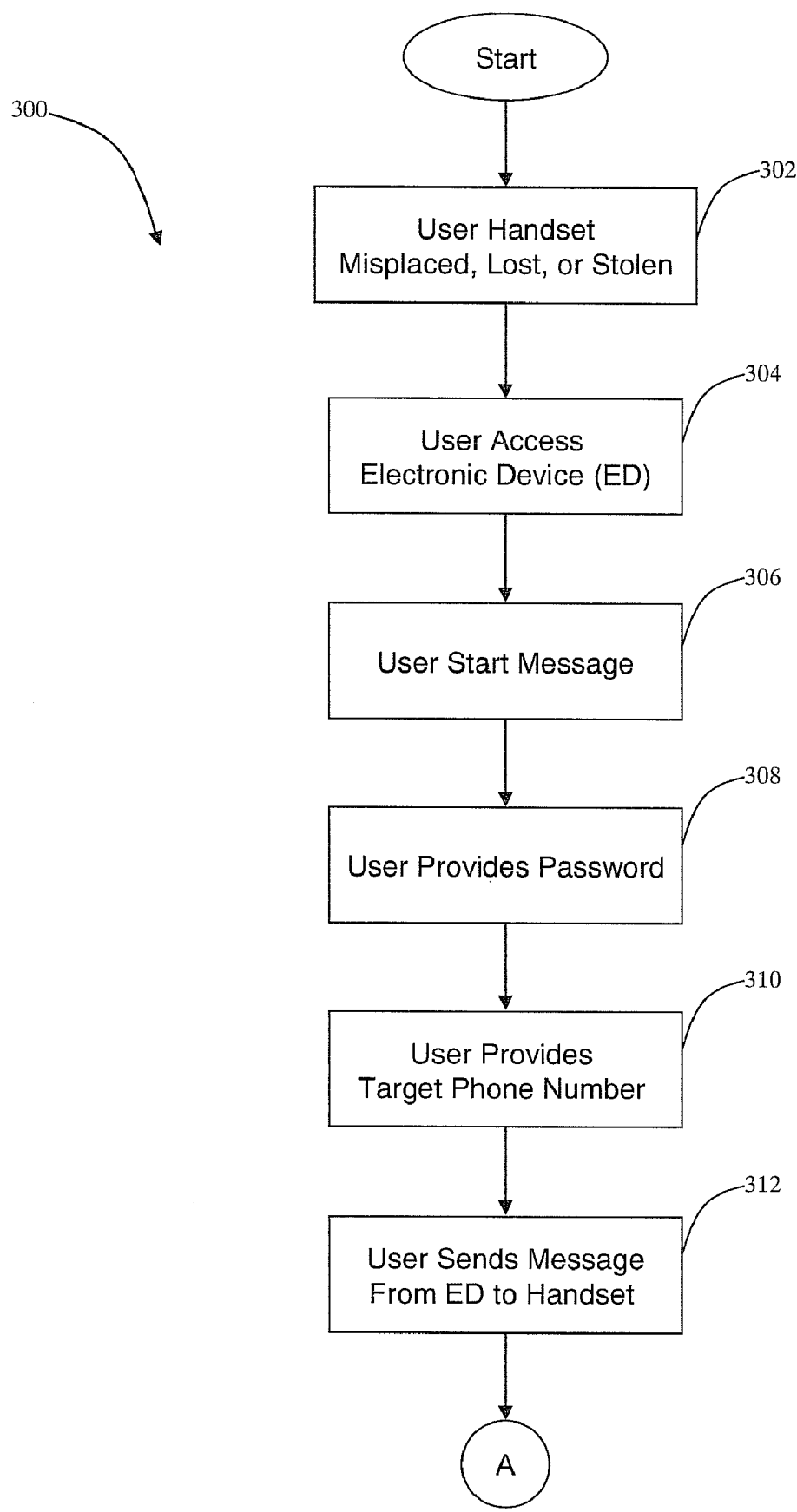
FIGS. 4A and 4B provide an illustrative flowchart of the operations performed after the handset is misplaced, lost or stolen.

Referring to FIG. 4A, there is shown an illustrative flowchart of the operations performed after the handset has been misplaced, lost or stolen as represented by block 302. The method then proceeds to block 304 where the authorized user of the missing handset 10 accesses a remote electronic device such as a telephone 18 or a networked computer 20 shown in FIG. 1. The authorized user then proceeds to block 306 where the user starts preparing a remote lock message. The remote lock message may be communicated using SMS messaging, e-mail, or any other means for communicating messages. At block 308, the authorized user provides a password that is sent to and received by the misplaced wireless handset 10. Additionally, at block 310, the authorized user provides a target phone number, which is the phone number that calls are transferred, forwarded, or routed to. The authorized user then proceeds to block 312 where the user sends the remote lock message from the remote electronic device to the missing handset 10.

Figure 4B:
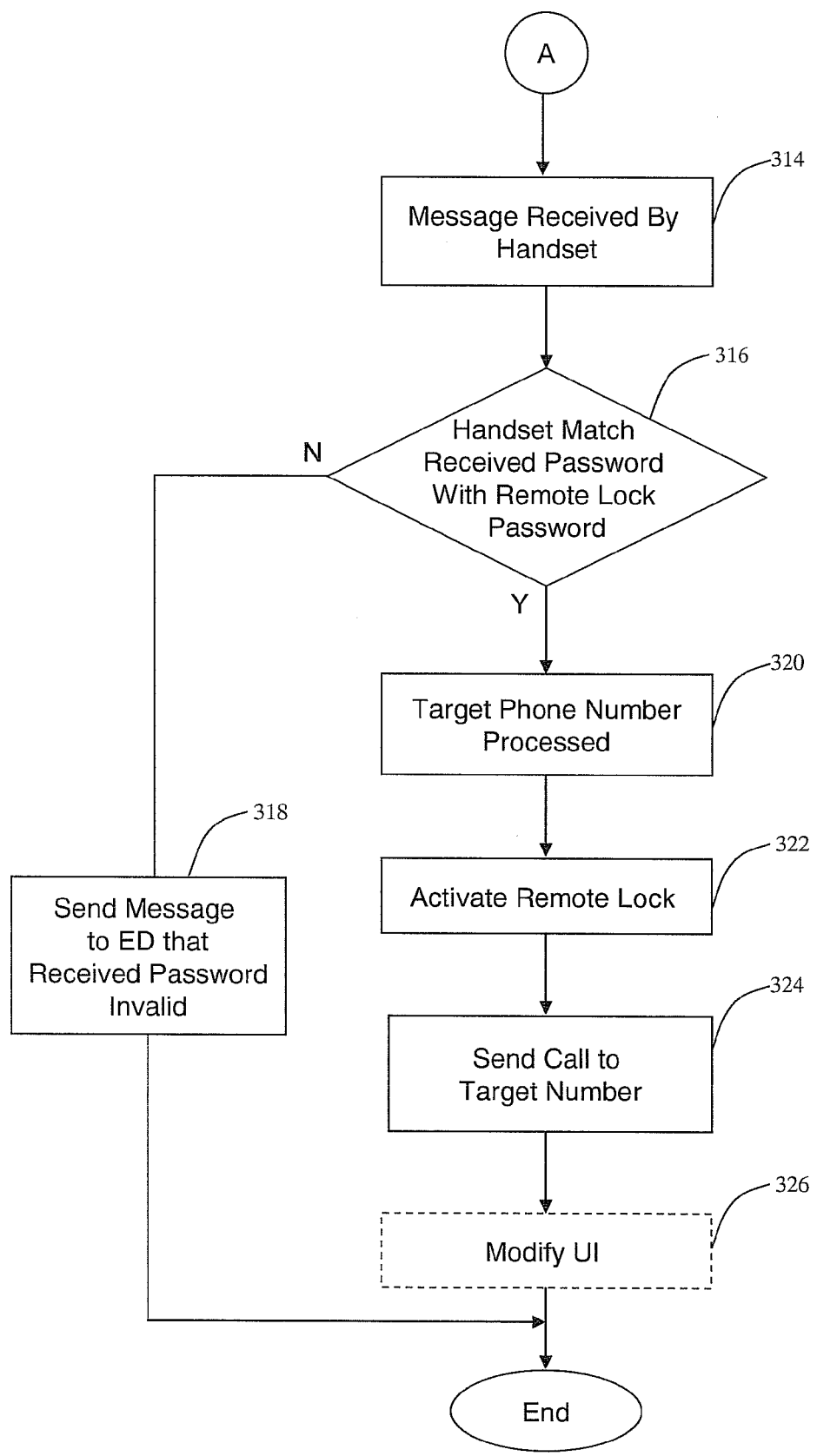

Referring now to FIG. 4B, there is shown a continuing flowchart of the operations performed after the remote lock message is received by the wireless handset at block 314. The method proceeds to decision diamond 316 where a determination is made whether there is a match between the received password (sent by the remote electronic device) and the remote lock password associated with the misplaced wireless handset 10. If there is no match, the method proceeds to block 318 where a message is sent back to the remote electronic device that the submitted or received password was invalid and remote control of the misplaced handset 10 was not established.

However, if there is match at decision diamond 316, the method proceeds to block 320 where the target phone number is processed by the network system 24, the handset processor 112, or a combination thereof. The method then proceeds to block 322 where the Remote Lock feature is activated and at least one call is sent to the target phone number as described in process block 324. Generally, all calls are sent to target phone number, unless it is an emergency 911 phone number. The method may then proceed to block 326 where the user interface is modified to inform the unauthorized user of the missing handset that all calls are being forwarded or transferred to the target number.

Figure 5:
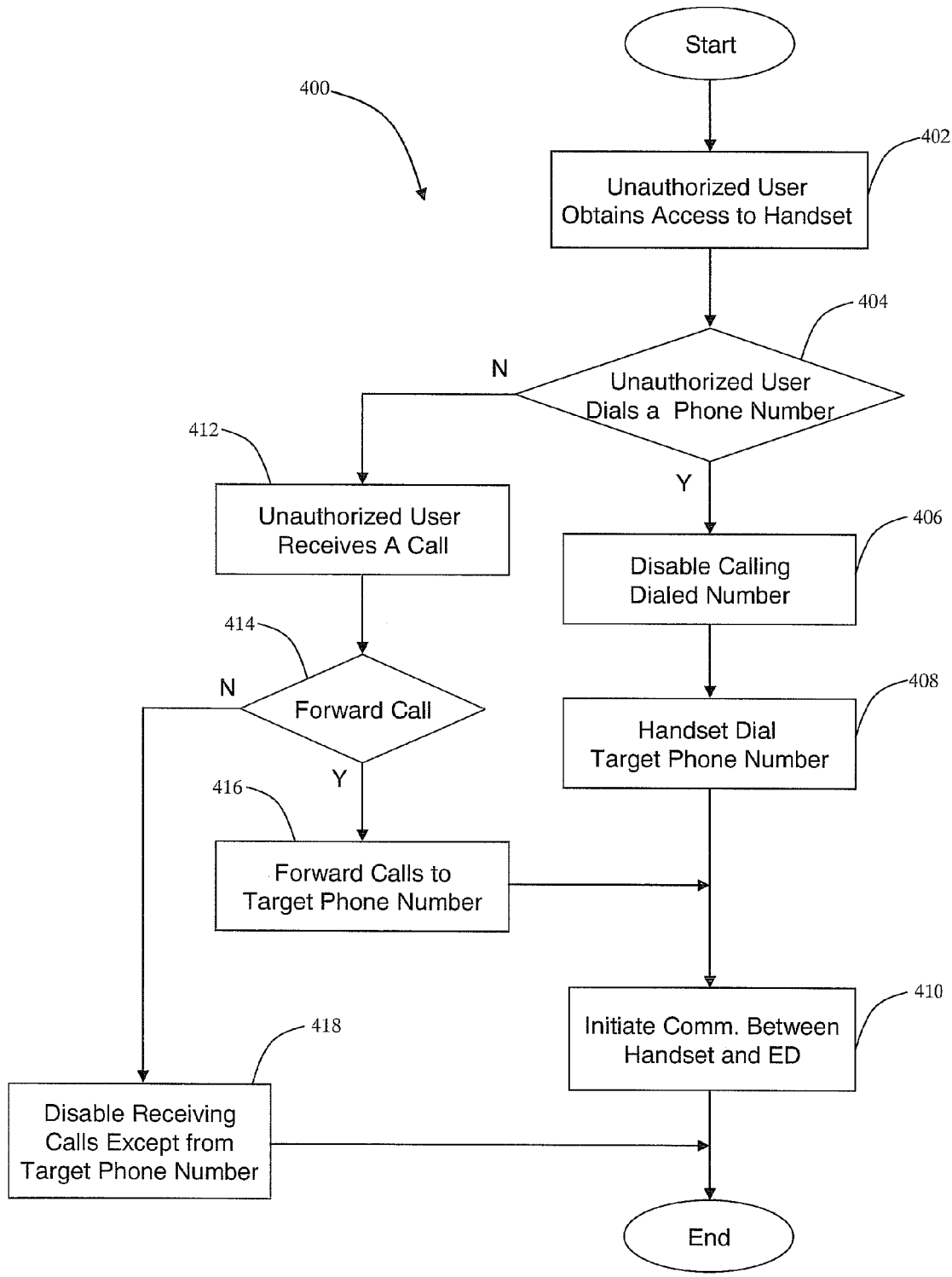
FIG. 5 provides an illustrative flowchart of the operations that may be performed by an unauthorized user after the Remote Lock feature has been activated on the missing handset.

Referring to FIG. 5, there is shown an illustrative flowchart of the operations that may be performed by an unauthorized user when Remote Lock is activated on the missing handset 10. In block 402, the unauthorized user obtains access to the missing handset 10. At decision diamond 404, the unauthorized user has an option to either dial a phone number or receive calls on the missing handset 10. If the unauthorized user decides to dial a number, the process of calling the dialed number is disabled as shown in block 406. The method then proceeds to block 408 where the handset dials the target phone number. At block 410, communications are enabled between the missing handset 10 and the electronic device associated with the target number.

If at decision diamond 404, the unauthorized user decides to receive one or more calls on the missing handset, the method proceeds to block 412. The method then continues to decision diamond 414 where a decision is made whether or not to forward the received calls. As described above, there may be carrier limitations associated with forwarding calls. If the decision is made to forward calls, then the method proceeds to block 416 where the received calls are forwarded to the target phone number, unless the call that is being received is from the target phone number. After the received calls are forwarded to the target phone number, communications are initiated between the missing handset and the electronic device associated with the target phone number.

If at decision diamond 414, the decision is made to not forward calls received on the missing handset 10, the method proceeds to block 418 where the unauthorized user is unable to receive calls on the missing handset 10, unless the received call is from the target phone number.

The systems, apparatus, and method described allow a user to have some control over a missing handset that may be lost or stolen. By remotely controlling the usage of the wireless handset, the owner can avoid having to quickly cancel the service and may be able to locate the missing handset more quickly because the handset owner may be able to communicate with the person that recovered the phone.

It is to be understood that the foregoing is a detailed description of illustrative embodiments. The scope of the claims is not limited to these specific embodiments or examples. For example, a wireless handset 100 is described, however this solution may be extended to any wireless handset in operative communication with a network system 24. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless handset that is remotely accessed, said handset comprising:
    a user interface resident on the wireless handset, the user interface configured to enable the wireless handset to be remotely controlled with a remote lock password;
    a handset memory configured to store the remote lock password;
    a processor adapted to receive a remote lock message from another electronic device that remotely accesses the wireless handset, the remote lock message comprising a received password and a target phone number;
    a software module that first matches the received password with the remote lock password and then:
    sends at least one call to the target phone number, wherein the software module is configured to forward at least one received call to the target phone number by rerouting a received call in progress to the target phone number;
    transfer at least one outgoing call to the target phone number; and
    wherein the software module modifies the user interface to indicate that outgoing calls are transferred to the target phone number.

2. The wireless handset of claim 1 wherein the remote lock message comprises a SMS message.

3. The wireless handset of claim 1 wherein the electronic device generating the message is a telephony device.

4. The wireless handset of claim 1 wherein the electronic device generating the message is a networked computer.

5. A wireless handset operatively coupled to a network system and configured to be remotely accessed, said wireless handset and network comprising:
- a handset user interface resident on the wireless handset, the handset user interface configured to enable the wireless handset to be remotely accessed with a remote lock password;
- a means for storing the remote lock password;
- a means for receiving a remote lock message from another electronic device that remotely accesses the wireless handset, wherein the remote lock message comprises a received password and a target phone number;
- a means for matching the received password with the remote lock password; and
- a means for sending at least one call to the target phone number, wherein the means for sending at least one call is configured to forward at least one received call to the target phone number by rerouting a received call in progress to the target phone number;
- transfer at least one outgoing call to the target phone number; and
- wherein the user interface indicates that outgoing calls are transferred to the target phone number.

6. The wireless handset and network of claim 5 wherein the remote lock message is a SMS message.

7. The wireless handset and network of claim 5 wherein the electronic device generating the message is a telephony device.

8. The wireless handset and network of claim 5 wherein the electronic device generating the message is a networked computer.

9. A method executed by a wireless handset for controlling usage of the wireless handset, the method comprising:
- receiving input indicative of a remote lock password;
- storing the remote lock password;
- receiving a remote lock message that originates from another electronic device that remotely accesses the wireless handset, the remote lock message comprises a received password and a target phone number;
- comparing the received password with the remote lock password;
- sending at least one call to the target phone number if the received password matches the remote lock password;
- forwarding at least one received call to the target phone number by rerouting a received call in progress to the target phone number;
- transferring at least one outgoing call to the target phone number; and
- modifying a user interface to indicate that outgoing calls are transferred to the target phone number.

10. The method of claim 9 wherein the remote lock message is a SMS message.

11. The method of claim 9 wherein the electronic device generating the message is a telephony device.

12. The method of claim 9 wherein the electronic device generating the message is a networked computer.

* * * * *